Figure 1:
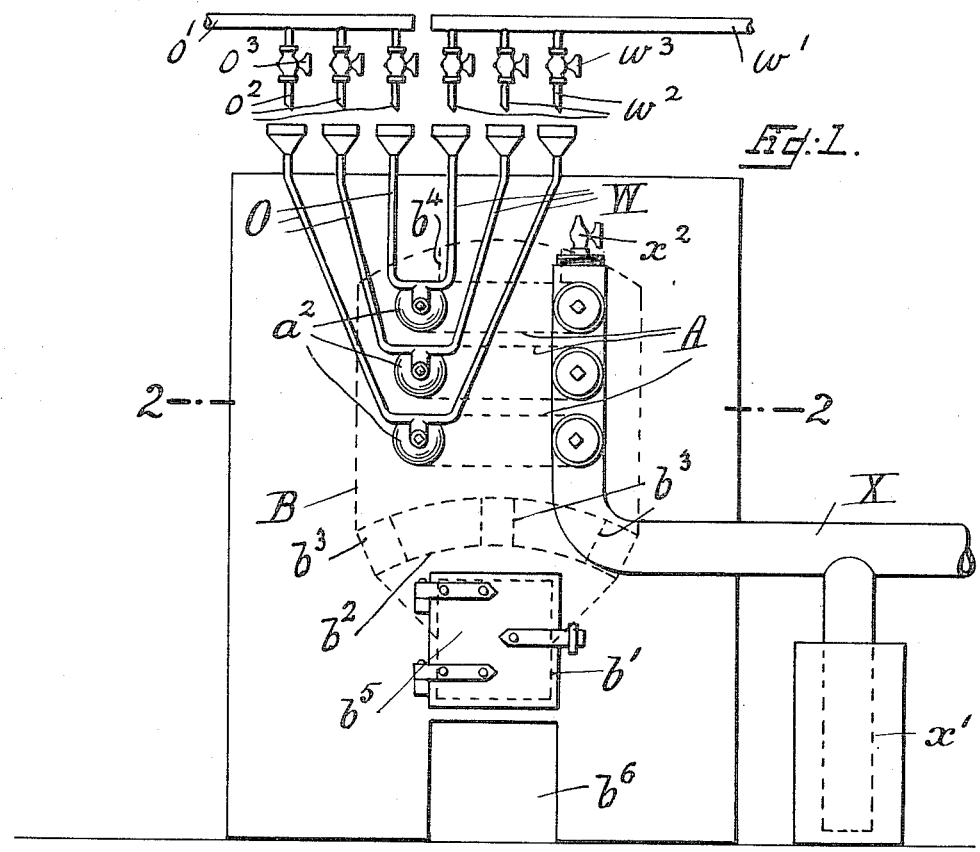

J. NOAD.
TREATMENT OF HYDROCARBON OILS AND THE LIKE.
APPLICATION FILED JULY 11, 1908.

971,468.

Patented Sept. 27, 1910.

INVENTOR
JAMES NOAD

UNITED STATES PATENT OFFICE.

JAMES NOAD, OF EAST HAM, ENGLAND, ASSIGNOR OF ONE-HALF TO EDWARD JOSEPH TOWNSEND, OF LONDON, ENGLAND.

TREATMENT OF HYDROCARBON OILS AND THE LIKE.

971,468.  Specification of Letters Patent.  Patented Sept. 27, 1910.

Application filed July 11, 1908. Serial No. 443,092.

*To all whom it may concern:*

Be it known that I, JAMES NOAD, a subject of the King of Great Britain and Ireland, and a resident of East Ham, Essex, England, have invented certain new and useful Improvements in the Treatment of Hydrocarbon Oils and the Like; and I do hereby declare the following to be a full, clear, and exact description of the same.

This invention relates to a process for converting hydrocarbon oils into volatile spirit.

The invention consists in introducing the oil to be converted in liquid form and water in liquid form in contiguous relation into a common chamber or retort from which air is excluded and which is packed with scrap iron or is otherwise adapted to present a considerable area of iron in interstitial passages and is maintained highly heated by a furnace or other suitable means, so that such liquids are vaporized and decomposed or dissociated in the presence of each other and of the highly heated iron which acts as a catalytic agent and the vapors are caused to pass through the said interstitial passages. The resultant vapors are condensed and the condensed products or the light portions thereof are rectified to separate the volatile spirit.

The said chamber or retort may be made of fire clay or other suitable refractory material and of a relatively elongated and narrow or other suitable formation.

The proportional quantities of the oil and water required to obtain the most satisfactory result will depend upon the particular oil under treatment and are readily determinable in practice.

In carrying out the invention, by way of a practical example, as applied to the production of volatile spirit suitable for use in internal combustion engines, from North American solar oil of about .863 s. g. The oil to be converted and water are fed from separate reservoirs and are contiguously dropped or passed in fine streams, in approximately the proportions of 2 parts of oil to 1 part of water, into one end of a closed chamber or retort packed as aforesaid with loose or scrap iron and maintained at a dull red heat, say, about 900° Fahrenheit. The vapors which result from the reaction within the chamber are led from the other end of the chamber to any suitable condensing apparatus. The condensed products or the light portions thereof are conveyed to a rectifying still heated to a temperature say not exceeding about 300° Fahrenheit to separate the desired volatile spirit. The residue from the rectifying still and any heavy products that may have been condensed and not rectified may be returned to the reaction chamber for re-treatment.

I do not broadly claim bringing steam and heavy oil into contact with heated iron for the purpose of converting the heavy oil into light oil.

The present process is of advantage in relation to known processes, in that it enables a much higher percentage and practically the whole of the oil to be converted into volatile spirit and avoids the production of more than a very low percentage of permanent gas and residual carbon.

The accompanying drawings illustrate, by way of example, an apparatus suitable for carrying out the invention.

Figure 2:
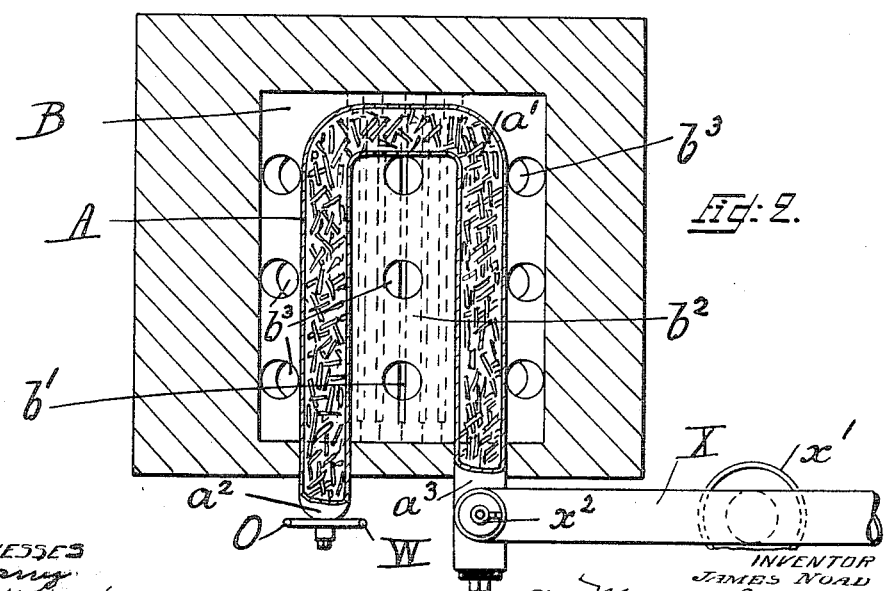

Figure 1 is a front elevation; and Fig. 2 is a plan, partly in section on the line 2—2, Fig. 1.

A, A, are closed retorts packed with loose or scrap iron, $a^1$. The retorts are mounted in a fireproof chamber, B, which is heated by a furnace, $b^1$. The chamber B is separated from the furnace, $b^1$ by a partition $b^2$, which has holes $b^3$ for the products of combustion from the furnace to pass through into the chamber.

$b^4$ is a flue leading to the chimney.

$b^5$ is a fire door, and $b^6$ an ash pit.

The inlet end, $a^2$ of each retort is in communication with two branch pipes, O, W, made funnel-shape at their upper ends.

$o^1$ is a main fitted with branch pipes, $o^2$, having cocks $o^3$, for supplying oil in regulable quantity to the pipes O.

$w^1$ is a main fitted with branch pipes, $w^2$ having cocks $w^3$, for supplying water in regulable quantity to the pipes W.

The outlet ends, $a^3$ of the retorts are in communication with a main X, for leading the vapors to suitable condensing apparatus.

$x^1$ is a water seal, and $x^2$ is a test cock.

What I claim is:

The process of converting mineral oil into petroleum spirit, consisting in introducing the oil in liquid form and water in liquid form in contiguous relation into a retort, decomposing or dissociating the oil and water by allowing them in contiguous relation to come into intimate contact within said retort with iron heated to a temperature of about 900 degrees Fahrenheit, and leading off the resultant vapor products to a condenser, substantially as described.

In testimony whereof I affix my signature, in presence of two subscribing witnesses.

JAMES NOAD.

Witnesses:
CHARLES AUBREY DAY,
WILLIAM ARTHUR MCMULLEN.